(12) United States Patent
Shah et al.

(10) Patent No.: US 8,891,942 B2
(45) Date of Patent: Nov. 18, 2014

(54) METHOD AND APPARATUS FOR AUTOMATICALLY GENERATING A TILT-SHIFT EFFECT IN A VIDEO

(71) Applicant: Adobe Systems Inc., San Jose, CA (US)

(72) Inventors: Abhishek Shah, Pitam Pura (IN); Ankuj Gupta, Rohini (IN)

(73) Assignee: Adobe Systems Incorporated, San Jose, CA (US)

(*) Notice: Subject to any disclaimer, the term of this patent is extended or adjusted under 35 U.S.C. 154(b) by 6 days.

(21) Appl. No.: 13/739,147

(22) Filed: Jan. 11, 2013

(65) Prior Publication Data
US 2014/0199049 A1 Jul. 17, 2014

(51) Int. Cl.
H04N 9/79 (2006.01)
(52) U.S. Cl.
CPC ........................................ *H04N 9/79* (2013.01)
USPC ......................................................... 386/280
(58) Field of Classification Search
USPC ......................................................... 386/280
See application file for complete search history.

(56) References Cited

U.S. PATENT DOCUMENTS

| 7,911,513 | B2 | 3/2011 | Garrison et al. |
| 8,026,931 | B2 | 9/2011 | Sun et al. |
| 2002/0180870 | A1* | 12/2002 | Chen .......................... 348/207.1 |
| 2010/0129048 | A1 | 5/2010 | Pitts et al. |
| 2013/0107051 | A1* | 5/2013 | Maruoka et al. .............. 348/148 |

FOREIGN PATENT DOCUMENTS

WO   WO 2012/103554 A2   8/2012

* cited by examiner

*Primary Examiner* — Hung Dang
*Assistant Examiner* — Sunghyoun Park
(74) *Attorney, Agent, or Firm* — Moser Taboada

(57) ABSTRACT

A computer implemented method and apparatus for automatically generating a tilt-shift effect in a video. The method comprises detecting one or more objects within a sequence of frames; determining a movement of the one or more objects; determining a direction of the determined movement of the one or more objects; generating a polygon around the one or more moving objects; and applying a blur effect to areas of the frame that are outside of each generated polygon.

20 Claims, 3 Drawing Sheets

METHOD AND APPARATUS FOR AUTOMATICALLY GENERATING A TILT-SHIFT EFFECT IN A VIDEO

BACKGROUND OF THE INVENTION

1. Field of the Invention

Embodiments of the present invention generally relate to video editing and, more particularly, to a method and apparatus for automatically generating a tilt-shift effect in a video.

2. Description of the Related Art

Video editing is a common task for many camera users. Various video editors are available for creating and editing video, such as ADOBE° PHOTOSHOP® and ADOBE® AFTER EFFECTS®. These video editors allow a user to manipulate and alter video content. Tilt-shift photography is the use of camera movements on a normal scene to simulate a miniature scene. To create a tilt-shift effect in a photograph, an area of focus is selected and the areas outside of the area of focus have a blur effect applied. By applying a minimum blur closest to the area of focus and increasing the blur effect throughout the area outside of the area of focus to a maximum blur furthest away from the area of focus, the tilt-shift effect is created.

Currently, to create a tilt-shift effect in a photograph, a user must manually select areas of focus and blur the rest of the frame, using a two-step process. In a video sequence, this process must be performed for each frame of the entire video sequence. This process is time consuming and cumbersome.

Therefore, there is a need for a method and apparatus for automatically generating a tilt-shift effect in a video.

SUMMARY OF THE INVENTION

A method and apparatus for automatically generating a tilt-shift effect in a video substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
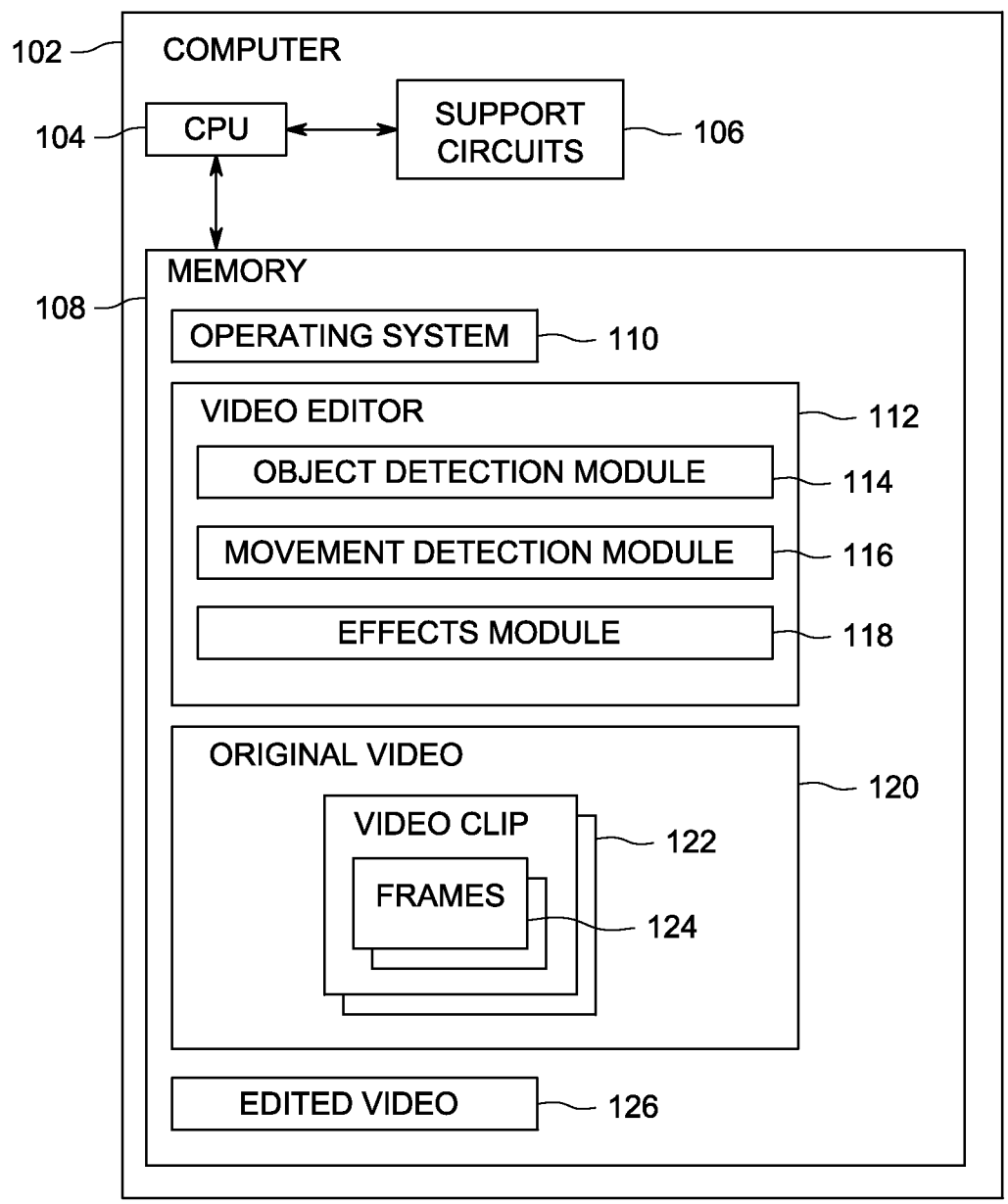
FIG. 1 is a block diagram of a system for automatically generating a tilt-shift effect in a video, according to one or more embodiments.

While the method and apparatus is described herein by way of example for several embodiments and illustrative drawings, those skilled in the art will recognize that the method and apparatus for automatically generating a tilt-shift effect in a video is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for automatically generating a tilt-shift effect in a video defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for automatically generating a tilt-shift effect in a video. The video, also referred to as a video sequence may comprise one or more video clips. Each video clip may comprise a plurality of scenes, each scene comprising a plurality of frames. A video clip is divided into scenes. The embodiments detect objects in each frame of a scene. In some embodiments, each object is compared to itself from one frame to the next in order to determine what objects are moving in the scene and a direction in which the object(s) are moving. In some embodiments, the objects in a predefined percentage at the beginning of a scene are compared to the objects in a predefined percentage at the end of a scene, and the information is extrapolated to predict a trajectory of any moving object. In some embodiments, a user may select an object in which to track. A polygon is generated around each moving object and extended in the direction of the movement. Finally, a linear blur effect is applied to the area outside of the polygon(s). In order to generate the tilt-shift effect, the area adjacent to the polygon is applied a minimum blur with the blur increasing through the area with a maximum blur applied to the areas farthest away from the polygon.

Advantageously, the tilt-shift effect is automatically generated making the process less time-consuming and cumbersome.

Various embodiments of a method and apparatus for automatically generating a tilt-shift effect in a video are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for automatically generating a tilt-shift effect in a video, according to one or more embodiments. The system 100 comprises a computer 102. The computer 102 comprises a Central Processing Unit (or CPU) 104, support circuits 106, and a memory 108. The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 comprises at least one of Read Only Memory (ROM), Random Access Memory (RAM), disk drive storage, optical storage, removable storage and/or the like.

The memory 108 comprises an operating system 110, a video editor 112, an original video 120, and an edited video 122. The operating system 110 may comprise various commercially known operating systems. The video editor 112 comprises an object detection module 114, a movement detection module 116, and an effects module 118. The object detection module 114 may comprise one or more facial recognition software and object recognition software products known in the art. The original video 120 comprises one or more video clips 112. Each video clip 122 comprises a plurality of frames 124.

The video editor 112 accesses the original video 120. The object detection module 114 detects objects and/or faces in each frame 124 of a video clip. The movement detection module 116 determines the direction in which the detected objects are moving from frame to frame and generates a polygon on each frame extending in the direction of the movement. The effects module 118 applies a blur effect in the area of each frame that is outside of the polygon. The effects module 118 divides the area outside the polygon into sections. The effects module 118 applies a minimum blur effect to the area closest, that is, adjacent, to the outer bounds of the polygon and increases the blur effect such that the area at the edge of the frame (i.e., farthest from the polygon) is applied the maximum blur effect. It is noted that in some embodiments it may be desirable for the adjacent area to be located just inside the bounds of the polygon, so that the blur effect extends across the boundary of the polygon. This process is repeated for each scene of each video clip in the original video 120. When all editing is complete, the edited video 126 is stored in memory 108.

Figure 2:
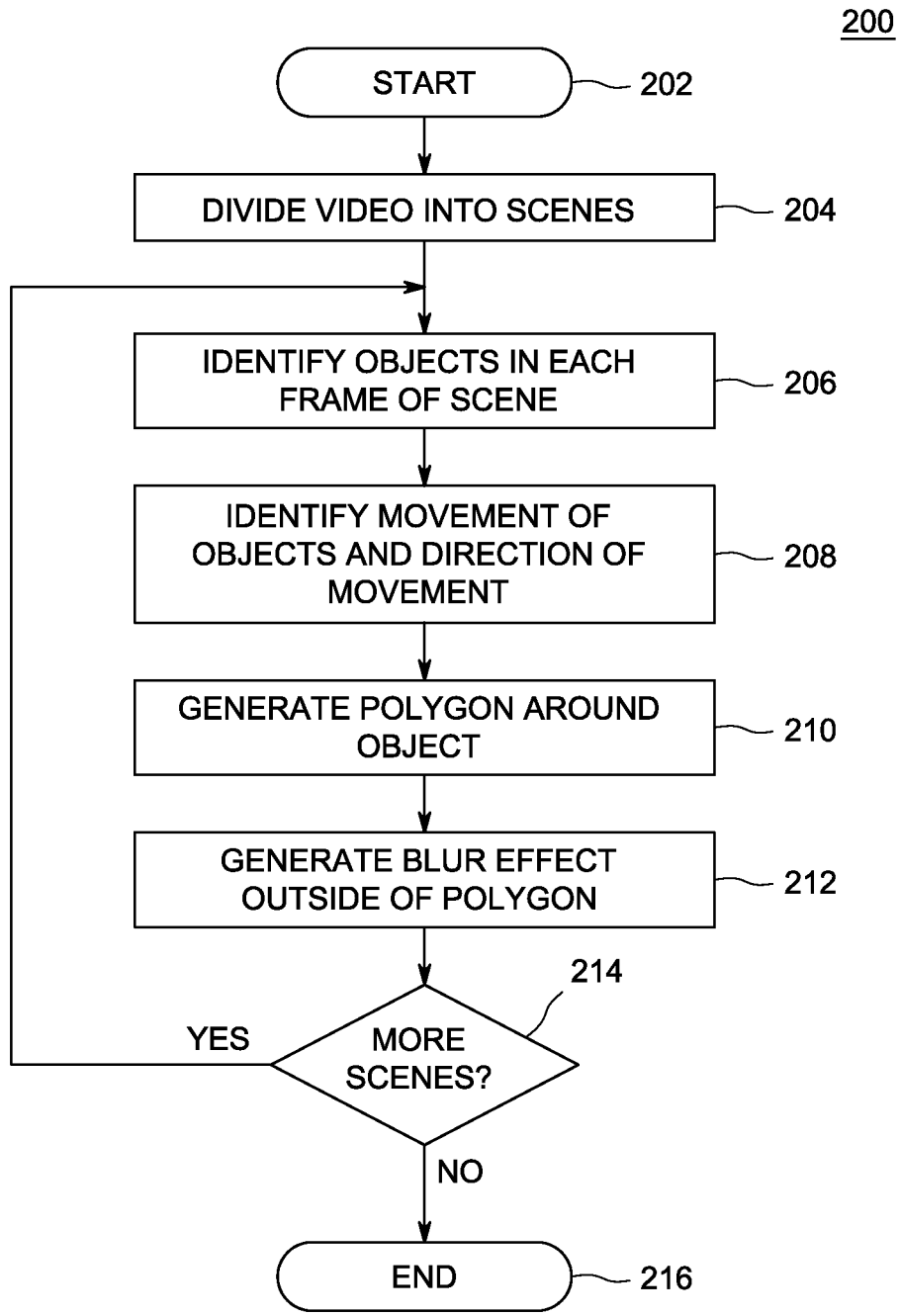
FIG. 2 depicts a flow diagram of a method for automatically generating a tilt-shift effect in a video as performed by the object detection module, the movement detection module, and the effects module of FIG. 1, according to one or more embodiments.

FIG. 2 depicts a flow diagram of a method for automatically generating a tilt-shift effect in a video as performed by the object detection module 114, the movement detection module 116, and the effects module 118 of FIG. 1, according to one or more embodiments. The method 200 detects objects in a sequence of frames and upon determining their movement, blurs the area outside of the area of movement of the detected object(s) throughout the video.

The method 200 starts at step 202 and proceeds to step 204. At step 204, the method 200 divides the video into scenes by looking for a pre-defined percentage change in video data (such as color values) in consecutive frames. For example, if the color values change by 20% or more from one frame to a next frame, a "scene change" is assumed. A video may comprise one or more video clips. Each clip may comprise one or more scenes. If the video comprises more than one scene, each scene is processed individually. The method 200 proceeds to step 206, where the method 200 detects objects and/or faces in each video frame of a scene.

The method 200 proceeds to step 208, where the method 200 determines the movement of objects in the scene and the direction of the movement. One well known way to determine object movement is to use a KLT Feature Tracker, whose C programming language source code is in the public domain and available for both commercial and non-commercial use. Although the KLT Feature Tracker is noted to be used herein, other types of feature trackers could be used as desired. The KLT Feature Tracker calculates interesting features that are detected in a frame, applies an identifier to the detected features and then tracks the identified features over successive frames. If there are a number of features being tracked in the successive frames, the tracker may divide areas of the frames into groups of features, where each group may represent an object in one frame, which objects can then be tracked automatically in successive frames. In some embodiments, the method 200 compares each object to itself from one frame to the next in order to determine what objects are moving in the scene and a direction in which the objects are moving. In some embodiments, the method 200 compares the position of objects in a predefined percentage of the frames at the beginning of a scene to the position of the objects in a predefined percentage at the end of a scene, and then extrapolates the information to predict the trajectory of a moving object. In some embodiments, the method 200 receives input from a user selecting an object in which to track and determines the direction in which the selected object is moving.

The method 200 proceeds to step 210. At step 210, the method 200 generates a polygon around the object extending in the direction of the movement. The size of the polygon (as measure in pixels) would vary based on the size of the object as well on the area traveled by the object over several successive frames. The polygon occupies all of the objects/faces that are moving within the video and extends toward the direction of the movement all the way to the edges of the frame. There may be more than one object moving within the video, for example a person walking along a beach and a bird flying through the sky. In such cases, a polygon will be generated around each moving objects extending in the direction of the movement of the object. The method 200 proceeds to step 212.

At step 212, the method 200 generates a blur effect outside of the polygon(s). The method 200 may divide the areas outside of the polygons into parallel regions. The method 200 applies a blur effect to each region outside of the polygon, with the region adjacent to the polygon receiving a minimal blur effect and the blur effect increasing to a maximum blur in the region farthest from the polygon. The blur effect is a well-known image processing algorithm, and can be accomplished by applying to the image pixels in the frame any of several well-known algorithms, such as the Gaussian Blur algorithm. The method 200 applies this effect on all frames of the video clip. In an alternative embodiment, it may be desirable that the minimum blur effect start in a region that is just inside the polygon and adjacent to its outside boundary. The method 200 proceeds to step 214.

At step 214, the method 200 determines if there are more scenes to edit. If there are more scenes within the video clip to edit, the method 200 proceeds to step 206 and iterates through the same process described above for each scene of each video clip in the video. When at step 214, the method 200 determines there are no more scenes to edit, the method 200 proceeds to step 216 and ends.

Figure 3A:
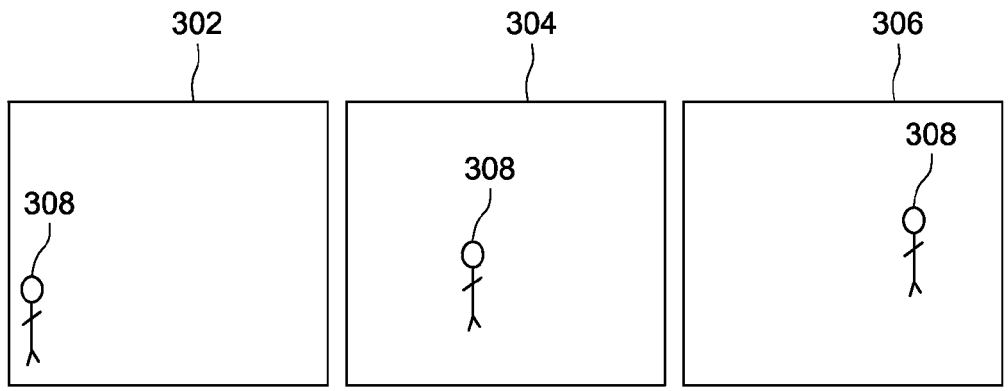
FIGS. 3A-3C together depict an illustration of the method for automatically generating a tilt-shift effect in a video as performed by the video editor of FIG. 1, according to one or more embodiments.
Figure 3B:
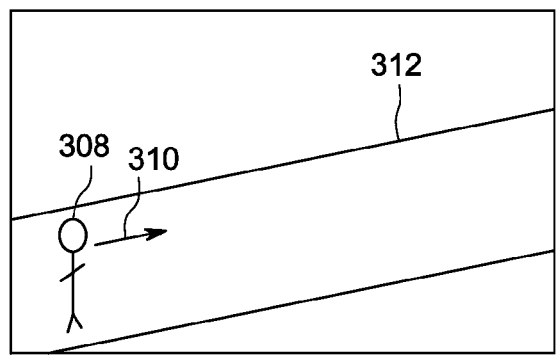
Figure 3C:
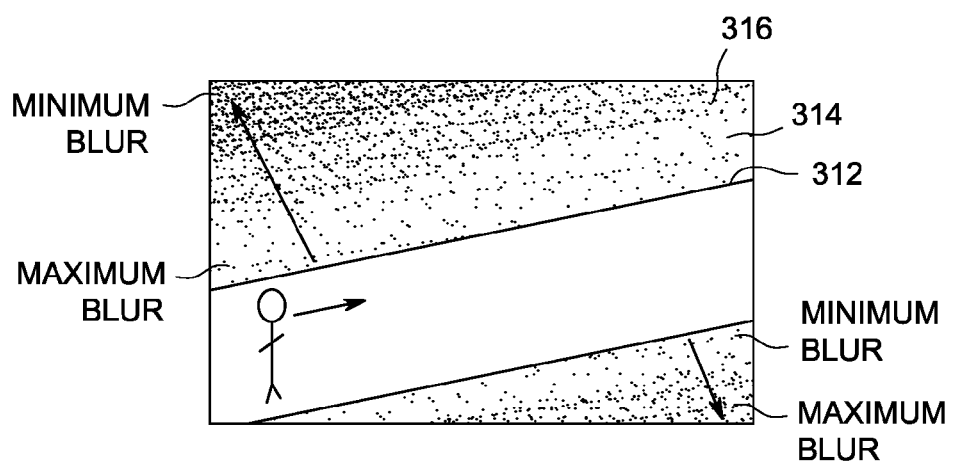

FIGS. 3A-3C together depict an illustration of the method 200 for automatically generating a tilt-shift effect in a sequence of frames as performed by the video editor 112 of FIG. 1, according to one or more embodiments. The frames 302, 304, and 306 of the sequence of frames 300 are evaluated to detect objects and determine their movement within the video clip.

FIG. 3A depicts an object recognition operation, wherein objection detection module 114 of FIG. 1 detects an object 308. The object 308 is detected in a different location within frames 302, 304, and 306.

FIG. 3B depicts a composite representing the movement detection operation, wherein the movement detection module 116 of FIG. 1 determines the direction 310 of the movement of the object 308 within the frames of the video clip 300 from the beginning frame to end frame. The polygon 312 is generated around the moving object 308 and extending in the direction of the movement to the edge of the frame.

FIG. 3C depicts application of a blur effect operation, wherein the effects module 118 of FIG. 1 generates a blur effect in the area outside of the polygon 312. The areas adjacent to the polygon 314, 318 receive an application of a minimum blur effect and the areas farthest from the polygon 316, 320 receive the maximum blur effect. As noted above, in an alternative embodiment it may be desirable that the minimum blur effect start in a region that is just inside the polygon and adjacent to its outside boundary.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
  detecting one or more objects within a sequence of frames;
  determining a movement of the one or more objects;
  determining a direction of the determined movement of the one or more objects;

generating a polygon comprising the one or more moving objects; and applying a blur effect to areas of the frame that are outside of the generated polygon, which blur effect is of a given intensity at an area adjacent to a boundary of the polygon and increases in intensity in areas that are further away from the boundary of the polygon.

2. The method of claim 1, wherein detecting comprises at least one of receiving a selection of an object in the plurality of frames or determining existence of an object using object recognition software.

3. The method of claim 1, wherein determining movement comprises comparing a difference in position of a detected object between a first frame and a second frame.

4. The method of claim 1, wherein determining movement comprises comparing a position of detected objects in a predefined percentage of frames at a beginning of a video clip to a position of the detected objects in a predefined percentage of frames at an end of a video clip, and predicting the trajectory of the one or more moving objects.

5. The method of claim 1, wherein the generated polygon extends in the direction of the determined movement of the object to the edge of the frame.

6. The method of claim 1, wherein applying the blur effect comprises:
    applying a minimum blur effect to an area adjacent to a boundary of the polygon; and
    applying a maximum blur effect to an area furthest away from the polygon.

7. The method of claim 6, where the area adjacent to the boundary of the polygon is outside the polygon.

8. An apparatus for automatically generating a tilt-shift effect in a video comprising:
    an object detection module for detecting one or more objects within a sequence of frames;
    a movement detection module for determining a movement of the one or more objects, determining a direction of the determined movement of the one or more objects, generating a polygon comprising each moving object; and
    an effects module for applying a blur effect to areas of the frame that are outside of each generated polygon, which blur effect is of a given intensity at an area adjacent to a boundary of the polygon and increases in intensity in areas that are further away from the boundary of the polygon.

9. The apparatus of claim 8, wherein detecting comprises at least one of receiving a selection of an object in the plurality of frames or determining existence of an object using object recognition software.

10. The apparatus of claim 8, wherein determining movement comprises comparing a difference in position of a detected object between a first frame and a second frame.

11. The apparatus of claim 8, wherein determining movement comprises comparing a position of detected objects in a predefined percentage of frames at a beginning of a video clip to a position of the detected objects in a predefined percentage of frames at an end of a video clip, and predicting the trajectory of the one or more moving objects.

12. The apparatus of claim 8, wherein the generated polygon extends in the direction of the determined movement of the object to the edge of the frame.

13. The apparatus of claim 8, wherein applying the blur effect comprises:
    applying a minimum blur effect to an area adjacent to a boundary of the polygon; and
    applying a maximum blur effect to an area furthest away from the polygon.

14. The method of claim 13, where the area adjacent to the boundary of the polygon is outside the polygon.

15. A non-transitory computer readable medium for storing computer instructions that, when executed by at least one processor causes the at least one processor to perform a method for automatically generating a tilt-shift effect in a video comprising:
    detecting one or more objects within a sequence of frames;
    determining a movement of the one or more objects;
    determining a direction of the determined movement of the one or more objects;
    generating a polygon comprising the one or more moving objects; and
    applying a blur effect to areas of the frame that are outside of each generated polygon, which blur effect is of a given intensity at an area adjacent to a boundary of the polygon and increases in intensity in areas that are further away from the boundary of the polygon.

16. The computer readable medium of claim 15, wherein detecting comprises at least one of receiving a selection of an object in the plurality of frames or determining existence of object using object recognition software.

17. The computer readable medium of claim 15, wherein determining movement comprises comparing a difference in position of a detected object between a first frame and a second frame.

18. The computer readable medium of claim 15, wherein determining movement comprises comparing a position of detected objects in a predefined percentage of frames at a beginning of a video clip to a position of the detected objects in a predefined percentage of frames at an end of a video clip, and predicting the trajectory of the one or more moving objects.

19. The computer readable medium of claim 15, wherein the generated polygon extends in the direction of the determined movement of the object.

20. The computer readable medium of claim 15, wherein applying the blur effect comprises:
    applying a minimum blur effect to an area adjacent to a boundary of the polygon; and
    applying a maximum blur effect to an area furthest away from the polygon.

* * * * *